United States Patent
Iwatsuka

(10) Patent No.: US 9,025,218 B2
(45) Date of Patent: May 5, 2015

(54) IMAGE-READING DEVICE SETTING READ POSITION FOR DETERMINING EDGE OF ORIGINAL SHEET

(71) Applicant: Kentaro Iwatsuka, Gifu (JP)

(72) Inventor: Kentaro Iwatsuka, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/037,819

(22) Filed: Sep. 26, 2013

(65) Prior Publication Data
US 2014/0092455 A1    Apr. 3, 2014

(30) Foreign Application Priority Data
Sep. 28, 2012   (JP) .................................. 2012-217021

(51) Int. Cl.
*H04N 1/04*    (2006.01)
*H04N 1/00*    (2006.01)

(52) U.S. Cl.
CPC ......... *H04N 1/0057* (2013.01); *H04N 1/00702* (2013.01)

(58) Field of Classification Search
USPC ........... 358/488, 486, 461, 496, 498; 399/371
See application file for complete search history.

(56) References Cited

U.S. PATENT DOCUMENTS

| | | | | |
|---|---|---|---|---|
| 7,130,090 B2 * | 10/2006 | Reid | | 358/475 |
| 7,327,502 B2 * | 2/2008 | Sheng | | 358/498 |
| 7,672,025 B2 * | 3/2010 | Luo | | 358/486 |
| 8,467,112 B2 * | 6/2013 | Takeuchi | | 358/498 |
| 8,749,856 B2 * | 6/2014 | Osakabe | | 358/474 |
| 2007/0285690 A1 * | 12/2007 | Matsuda et al. | | 358/1.9 |

FOREIGN PATENT DOCUMENTS

| | | |
|---|---|---|
| JP | 11-041416 A | 2/1999 |
| JP | 2004-120425 A | 4/2004 |
| JP | 2009-016904 A | 1/2009 |

* cited by examiner

*Primary Examiner* — Cheukfan Lee
(74) *Attorney, Agent, or Firm* — Scully, Scott, Murphy & Presser, P.C.

(57) ABSTRACT

In an image reading device, an opposing member opposes an image reading unit. The opposing member has a first part and a second part. A moving unit moves the image reading unit between first and second read positions. An image value generated by reading an image of the first part at the first read position is different from an image value generated by reading an image of the second part at the second read position. The control device is configured to: set a read position to selected one of the first read position and the second read position; control the moving unit to move the image reading unit to the read position; and determine that an edge of the original sheet reaches the reading region when image values generated by the image reading unit are changed while the conveying unit conveys the original sheet along the conveying path.

9 Claims, 8 Drawing Sheets

IMAGE-READING DEVICE SETTING READ POSITION FOR DETERMINING EDGE OF ORIGINAL SHEET

CROSS REFERENCE TO RELATED APPLICATION

This application claims priority from Japanese Patent Application No. 2012-217021 filed Sep. 28, 2012. The entire content of the priority application is incorporated herein by reference.

TECHNICAL FIELD

The present invention relates to a technique for conveying an original sheet and for reading an image from the original sheet as the sheet passes through the read region of an image-reading unit, and particularly to a technique for determining when an edge of an original sheet has arrived in the read region.

BACKGROUND

One type of image-reading device known in the art conveys an original sheet and reads an image from the original sheet as the sheet passes through the read region of an image-reading unit. This type of image-reading device determines whether the leading edge or the trailing edge of the original sheet has arrived at the read region and uses the determination results to set a read timing for the image-reading unit, the size of the original image included in the read image, and the like.

One example of this image-reading device disclosed in Japanese Patent Application Publication No. 2004-120425 includes an original-pressing plate disposed opposite the image-reading unit. On the original-pressing plate is depicted an identification image, such as a pattern with colors changing along a main scanning direction, a bar code, or a special design. The image-reading device determines that the leading edge or the trailing edge of the original sheet has arrived at the read region by determining whether the image data read by the image-reading unit is data for the identification image or other image data.

SUMMARY

However, in the conventional image-reading device described above, the identification image depicted on the original-pressing plate may adversely affect the image of the original read by the image-reading unit in the prescribed read region.

However, when an identification image is not depicted on the original-pressing plate, the conventional image-reading device might incorrectly determine whether the leading edge or the like of the original sheet has arrived at the read region if values of the scanned image obtained in the prescribed read region are the same or similar when reading the original-pressing plate and when reading the original sheet.

In view of the foregoing, it is an object of the present invention to provide an image-reading device having no identification image depicted on an opposing member, such as an original-pressing plate, and being capable of reliably determining when the leading edge or the trailing edge of the original sheet has arrived in the read region.

In order to attain the above and other objects, the invention provides an image reading device. The image reading device includes a conveying unit, an image reading unit, an opposing member, a moving unit, and a control device. The conveying unit is configured to convey an original sheet along a conveying path. The image reading unit has a reading region on the conveying path, and is configured to perform a reading operation to generate an image value representing an image in the reading region. The opposing member opposes the image reading unit. The original sheet passes a space between the image reading unit and the opposing member. The opposing member has a first part and a second part. The moving unit is configured to move the image reading unit between a first read position and a second read position. The first part overlaps on the reading region when the image reading unit is positioned at the first read position. The second part overlaps on the reading region when the image reading unit is positioned at the second read position. The image value that the image reading unit generates by reading an image of the first part when the image reading unit is positioned at the first read position is different from an image value that the image reading unit generates by reading an image of the second part when the image reading unit is positioned at the second read position. The control device is configured to: set a read position to selected one of the first read position and the second read position; control the moving unit to move the image reading unit to the read position; control the image reading unit at the read position to perform the reading operation to generate the image value; and determine that one of a leading edge of the original sheet and a trailing edge of the original sheet reaches the reading region when image values generated by the image reading unit are changed while the conveying unit conveys the original sheet along the conveying path.

According to another aspect, the present invention provides a non-transitory computer-readable storage medium storing computer-readable instructions that, when executed by a processor, causes an image reading device that comprises: a conveying unit configured to convey an original sheet along a conveying path; an image reading unit having a reading region on the conveying path, and configured to perform a reading operation to generate an image value representing an image in the reading region; an opposing member opposing the image reading unit, the original sheet passing a space between the image reading unit and the opposing member, the opposing member having a first part and a second part; and a moving unit configured to move the image reading unit between a first read position and a second read position, the first part overlapping on the reading region when the image reading unit is positioned at the first read position, the second part overlapping on the reading region when the image reading unit is positioned at the second read position, an image value that the image reading unit generates by reading an image of the first part when the image reading unit is positioned at the first read position being different from an image value that the image reading unit generates by reading an image of the second part when the image reading unit is positioned at the second read position, the instructions comprising: setting a read position to selected one of the first read position and the second read position; controlling the moving unit to move the image reading unit to the read position; controlling the image reading unit at the read position to perform the reading operation to generate the image value; and determining that one of a leading edge of the original sheet and a trailing edge of the original sheet reaches the reading region when image values generated by the image reading unit are changed while the conveying unit conveys the original sheet along the conveying path.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Figure 1:
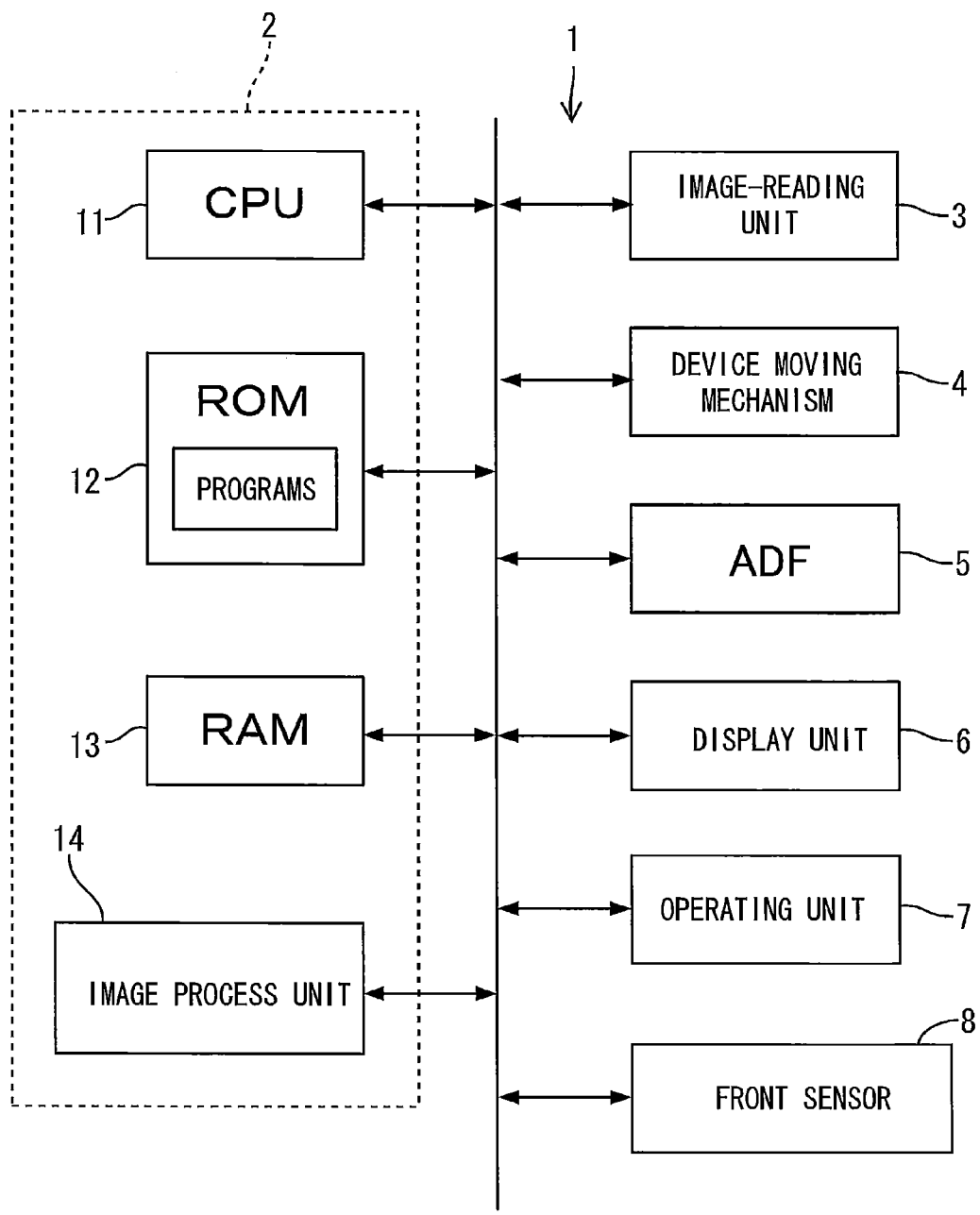
FIG. 1 is a block diagram showing the electrical structure of a scanner according to a first embodiment of the present invention.

Next, a scanner 1 according to an embodiment of the present invention will be described while referring to FIGS. 1 through 5. In the following description, the terms "upward", "downward", "upper", "lower", "above", "below", "beneath", "right", "left", "front", "rear" and the like will be used assuming that the scanner 1 is disposed in an orientation in which it is intended to be used. More specifically, the left side of the scanner 1 in FIG. 2 will be referred to as the front side ("F" in the drawings), the near side as the right side ("R" in the drawings), and the top as the upper side ("U" in the drawings).

Electrical Configuration of the Scanner

As shown in FIG. 1, the scanner 1 includes a control unit 2, an image-reading unit 3, a device moving mechanism 4, an automatic document feeder (ADF) 5, a display unit 6, an operating unit 7, and a front sensor 8.

The control unit 2 possesses a central processing unit (CPU) 11, a ROM 12, a RAM 13, and an image process unit 14. The ROM 12 stores a program for executing a read control process described later, and programs for executing various operations on the scanner 1. The CPU 11 controls the components of the scanner 1 based on programs read from the ROM 12. The various programs mentioned above may be stored on a medium other than the ROM 12 and RAM 13, including nonvolatile memory such as a CD-ROM, a hard disk drive, or flash memory (registered trademark).

The RAM 13 stores scan data for an image read by the image-reading unit 3. More specifically, the image-reading unit 3 produces scan data for rows of pixels based on the scanned image, an A/D conversion unit (not shown) converts this analog data to a digital form, and the image process unit 14 processes the data through shading compensation and the gamma compensation before the resulting data is stored in the RAM 13. The image process unit 14 is a hardware circuit dedicated to image processing.

The operating unit 5 includes a plurality of buttons that enable the user to perform various input operations. The display unit 6 has a liquid crystal display, LED lamps, and the like for displaying various option screens and the operating status of the device, for example. The image-reading unit 3, the ADF 4, and the front sensor 8 will be described later.

Structure of the Image-Reading Unit and ADF

Figure 2:
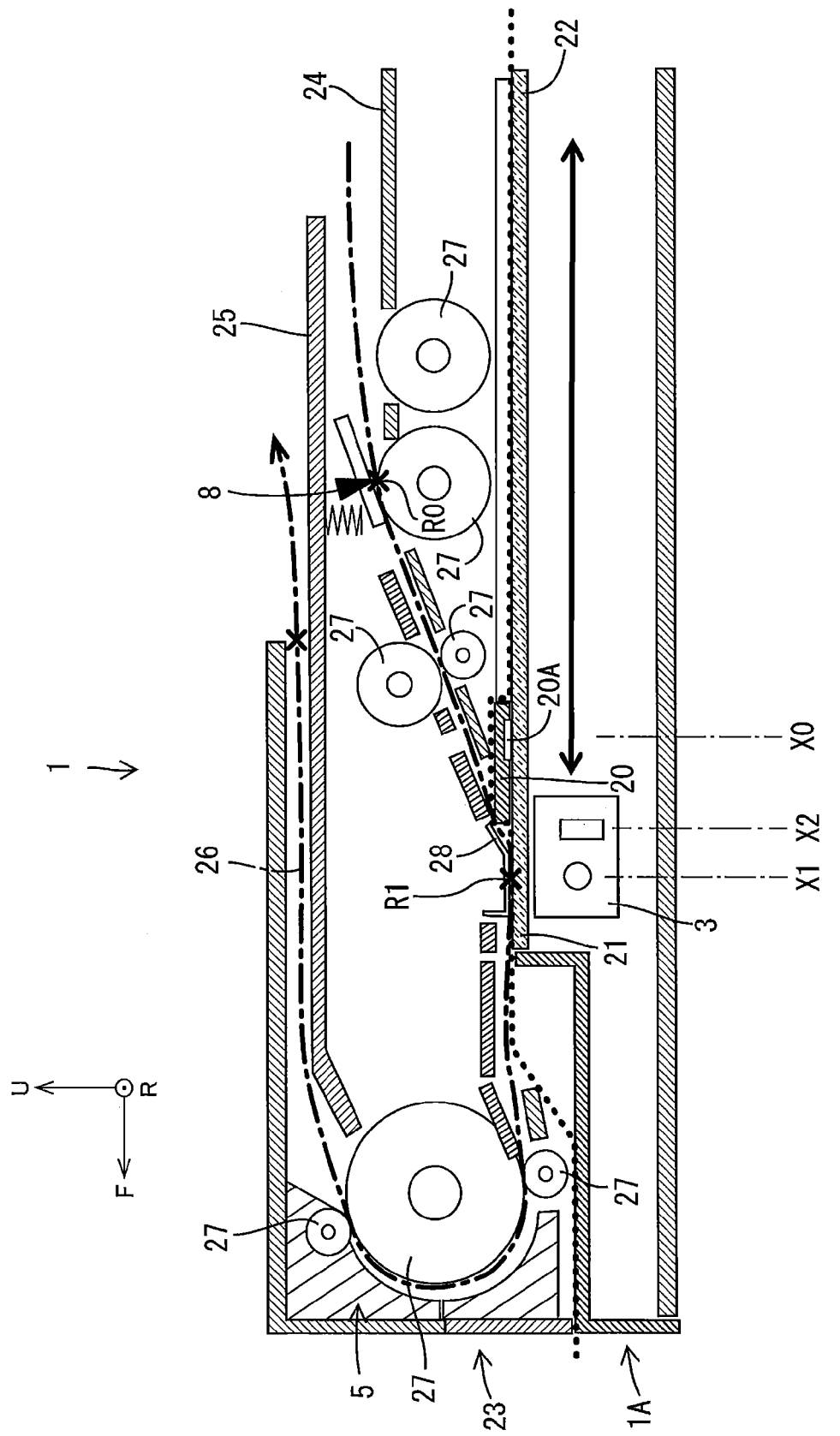
FIG. 2 is a schematic diagram of an image-reading unit and an automatic document feeder provided in the scanner of FIG. 1.

As shown in FIG. 2, the scanner 1 has a scanner body 1A. A dividing member 20, an ADF glass 21, and a flatbed glass 22 are provided on the top surface of the scanner body 1A. The dividing member 20 is positioned between the ADF glass 21 and the flatbed glass 22 in the front-rear direction. A white reference plate 20A is provided on the bottom surface of the dividing member 20. The white reference plate 20A is a white-colored member with a substantially uniform reflectance. Portions of the bottom surface of the dividing member 20 adjacent to the white reference plate 20A are black.

A cover 23 is also provided on the top surface of the scanner body 1A for covering the ADF glass 21 and the flatbed glass 22. The cover 23 is capable of opening and closing about one edge of the scanner body 1A. The ADF 5 and the front sensor 8 are provided inside the cover 23, and the image-reading unit 3 and the moving mechanism 4 are provided below the ADF glass 21 and the like.

The cover 23 is also provided with an original tray 24 for supporting original sheets to be scanned, and a discharge tray 25 disposed above the original tray 24 for receiving the original sheets after the scanning operation. The front sensor 8 is provided on the leading edge side (downstream edge in the conveying direction) of the original tray 24. The front sensor 8 detects the presence of original sheets in the original tray 24 at a detection region RO located at the leading edge side (downstream edge in the conveying direction) of the original tray 24 and transmits these detection results to the control unit 2.

A conveying path 26 is formed inside the cover 23. The conveying path 26 is U-shaped and serves to convey the original sheets from the original tray 24 to the discharge tray 25. The ADF 4 has a plurality of conveying rollers 27, an original-pressing member 28, and the like disposed along the conveying path 26. The ADF 4 is configured to convey the original sheets along the conveying path 26 automatically by driving the conveying rollers 27 to rotate. The original-pressing member 28 opposes the image-reading unit 3. The original-pressing member 28 is fixed to a prescribed region inside the cover 23 and faces an upper surface of the ADF glass 21 when the cover 23 is in a closing posture covering the ADF glass 21 and the flatbed glass 22.

The image-reading unit 3 is a reading device possessing a compact image sensor (CIS). The structure of the image-reading unit 3 and its positional relationship to the original-pressing member 28 will be described later in detail. Note that the image-reading unit 3 may be configured of a charge-coupled drive (CCD) image sensor or the like and is not limited to a CIS. Further, a moving mechanism 4 is provided for moving the image-reading unit 3 left and right in FIG. 2 beneath the ADF glass 21 and the flatbed glass 22 (see bold faced arrows in FIG. 2).

With this structure, the scanner 1 can execute an ADF reading operation and a flatbed reading operation. In the ADF reading operation, the image-reading unit 3 is kept stationary at a first read position X1 or a second read position X2 in confrontation with the original-pressing member 28 and reads the image from an original sheet conveyed by the ADF 5. In the flatbed reading operation, the image-reading unit 3 reads the image from an original sheet placed on the flatbed glass 22 while the moving mechanism 4 moves the image-reading unit 3 along the flatbed glass 22.

The moving mechanism moves the image-reading unit 3 to a position directly beneath the original-pressing member 28 for reading an original sheet conveyed by the ADF 4. The image-reading unit 3 reads the original image on the original sheet and transmits scan data corresponding to the image to the control unit 2.

Detailed Structure of the Image-Reading Unit

Figure 3:
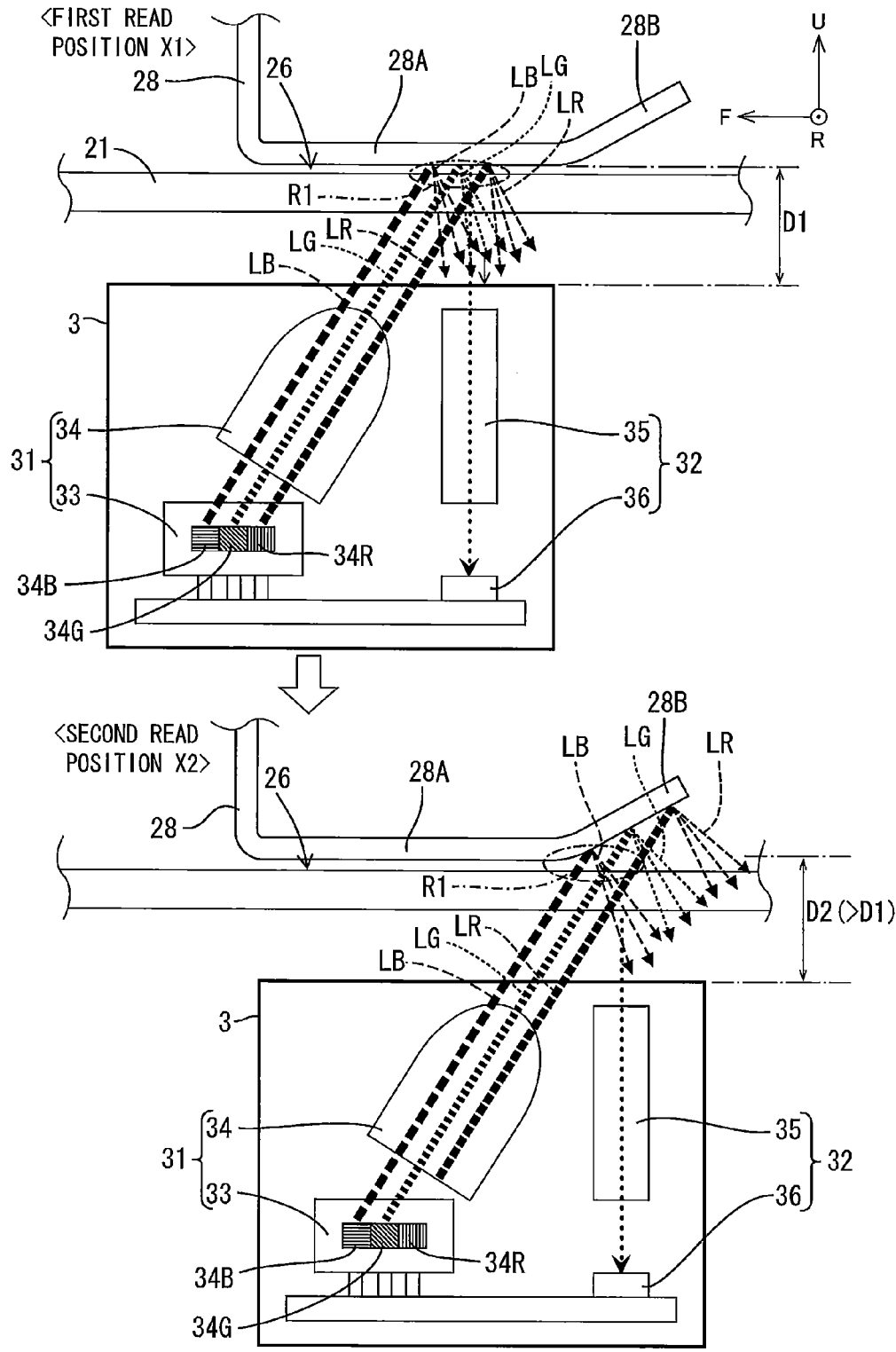
FIG. 3 is an explanatory diagram illustrating different distances between the image-reading unit and an original-pressing member.

As shown in FIG. 3, the image-reading unit 3 includes a light-emitting unit 31, and a light-receiving unit 32. The image-reading unit 3 according to the embodiment is configured such that the light-receiving unit 32 does not receive light reflected specularly off the original-pressing member 28 or the original sheet, but receives light reflected diffusely. Also, light rays LR, LG, and LB for respective colors red (R), green (G), and blue (B) are depicted with different types of lines in FIG. 3 to aid in distinguishing them, and the range of the read region R1 is exaggerated. In both the top and bottom examples of FIG. 3, the light rays LR, LG, and LB of the three colors are shown being reflected off the opposing surface of the original-pressing member 28.

More specifically, the light-emitting unit 31 includes a light-emitting diode (LED) circuit board 33, and a light tube 34. A red LED 34R for emitting the red light ray LR, a green LED 34G for emitting the green light ray LG, and a blue LED 34B for emitting the blue light ray LB are arranged on the LED circuit board 33 and juxtaposed in the front-rear direction (the conveying direction along the conveying path 26). The light tube 34 is an optical member that serves to guide the light rays LR, LG, and LB from the respective LEDs 34R, 34G, and 34B toward the read region R1.

The light-receiving unit 32 includes a receiver lens 35, and a light-receiving circuit board 36. The receiver lens 35 is an optical member for guiding light from the side nearest the read region R1 toward the light-receiving circuit board 36.

The light-receiving circuit board 36 includes a plurality of light-receiving elements 37 (see FIG. 4) aligned in the left-right direction, which will be called the main scanning direction. The outgoing direction of the light rays LR, LG, and LB is sloped relative to the direction in which the light-receiving unit 32 opposes the original-pressing member 28.

With this configuration, the image-reading unit 3 executes a reading operation for reading an image within the read region R1 and outputting scan data based on the read image. More specifically, the image-reading unit 3 executes a reading operation by controlling the light-emitting unit 31 to emit light from the LEDs 34R, 34G, and 34B through time-sharing, controls the light-receiving unit 32 to receive light rays LR, LG, and LB of the respective colors reflected within the read region R1, and sequentially outputs scan data for each of the RGB colors in a single main scan line as a set of scan data.

The original-pressing member 28 includes a first part 28A and a second part 28B that are positioned at different distances from the image-reading unit 3 disposed beneath the ADF glass 21. The first part 28A is a linear part that is generally parallel to the ADF glass 21. When the image-reading unit 3 is in the first read position X1 shown in the top half of FIG. 3, the read region R1 is located on the first part 28A and the distance between the image-reading unit 3 and the first part 28A is a first distance D1. Here, the read region R1 is located immediately above the light-receiving unit 32 when the image-reading unit 3 is in the first read position X1.

The second part 28B is slanted relative to the ADF glass 21. When the image-reading unit 3 is in the second read position X2 shown in the bottom half of FIG. 3, the read region R1 is located on the second part 28B and the distance between the image-reading unit 3 and the second part 28B is a second distance D2. Here, the read region R1 is located immediately above the light-receiving unit 32 when the image-reading unit 3 is in the second read position X2. The second distance D2 is greater than the first distance D1. The under surfaces of the first part 28A and the second part 28B opposing the image-reading unit 3 are both the same color (white, in the preferred embodiment). However, the opposing surface of the original-pressing member 28 need not be white, but may be gray or another color.

In an ADF reading operation, the area on the conveying path 26 between the original-pressing member 28 and the image-reading unit 3 serves as the read region R1. As shown in FIG. 2, this read region R1 moves when the read position of the image-reading unit 3 moves between the first read position X1 and the second read position X2. Since the first distance D1 and the second distance D2 are different, as described above, the values of scan data obtained while reading the original-pressing member 28 in a reading operation also differ depending on whether the image-reading unit 3 is in the first read position X1 or the second read position X2. Note that the values of scan data may include a pixel value for each color, color difference values indicating the differences between pixel values of each color, or the like. In other words, the scan data includes a plurality of values for each pixel.

Read Control Process

Figure 4:
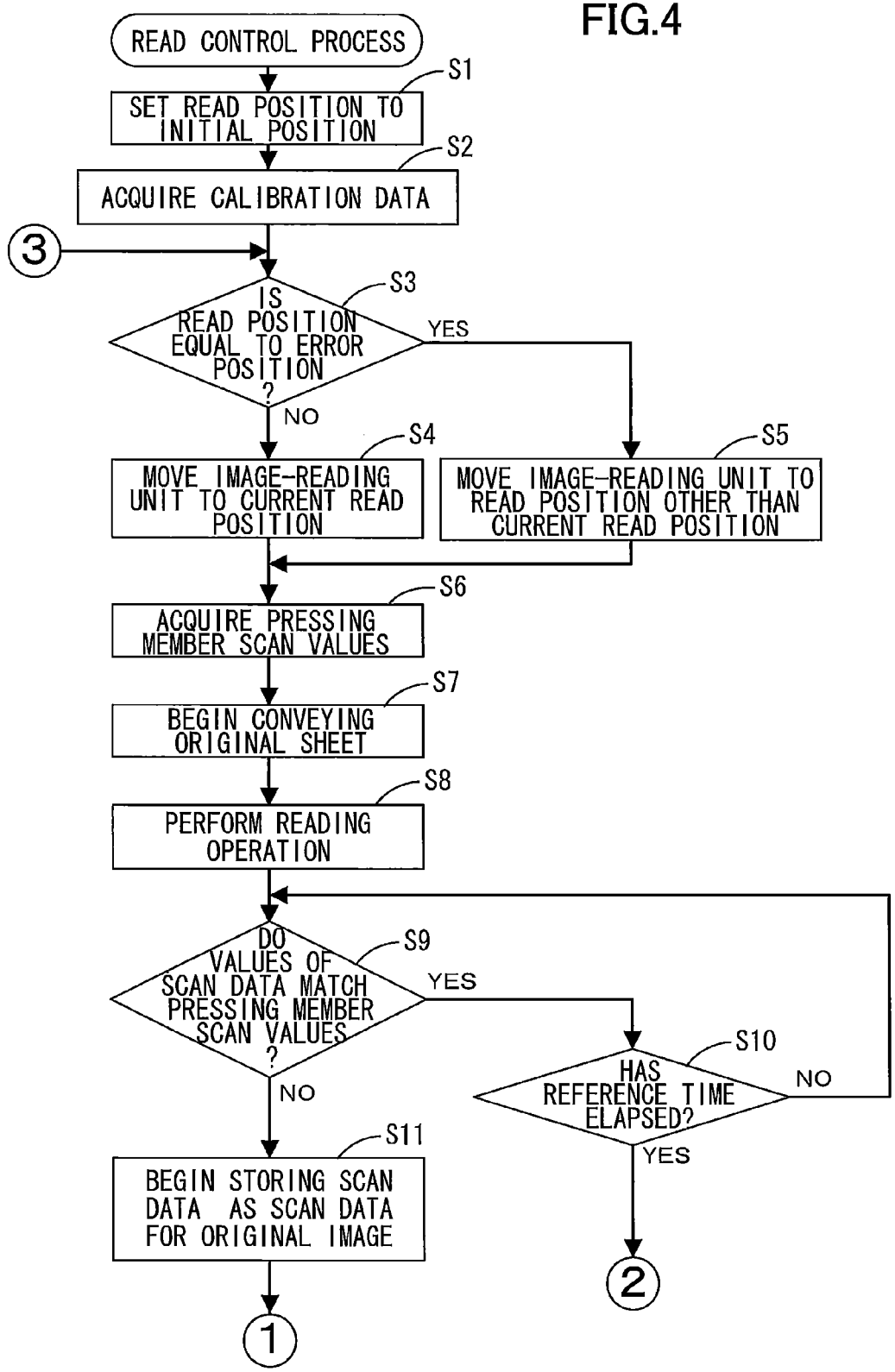
FIG. 4 is a first flowchart illustrating steps in a read control process.
Figure 5:
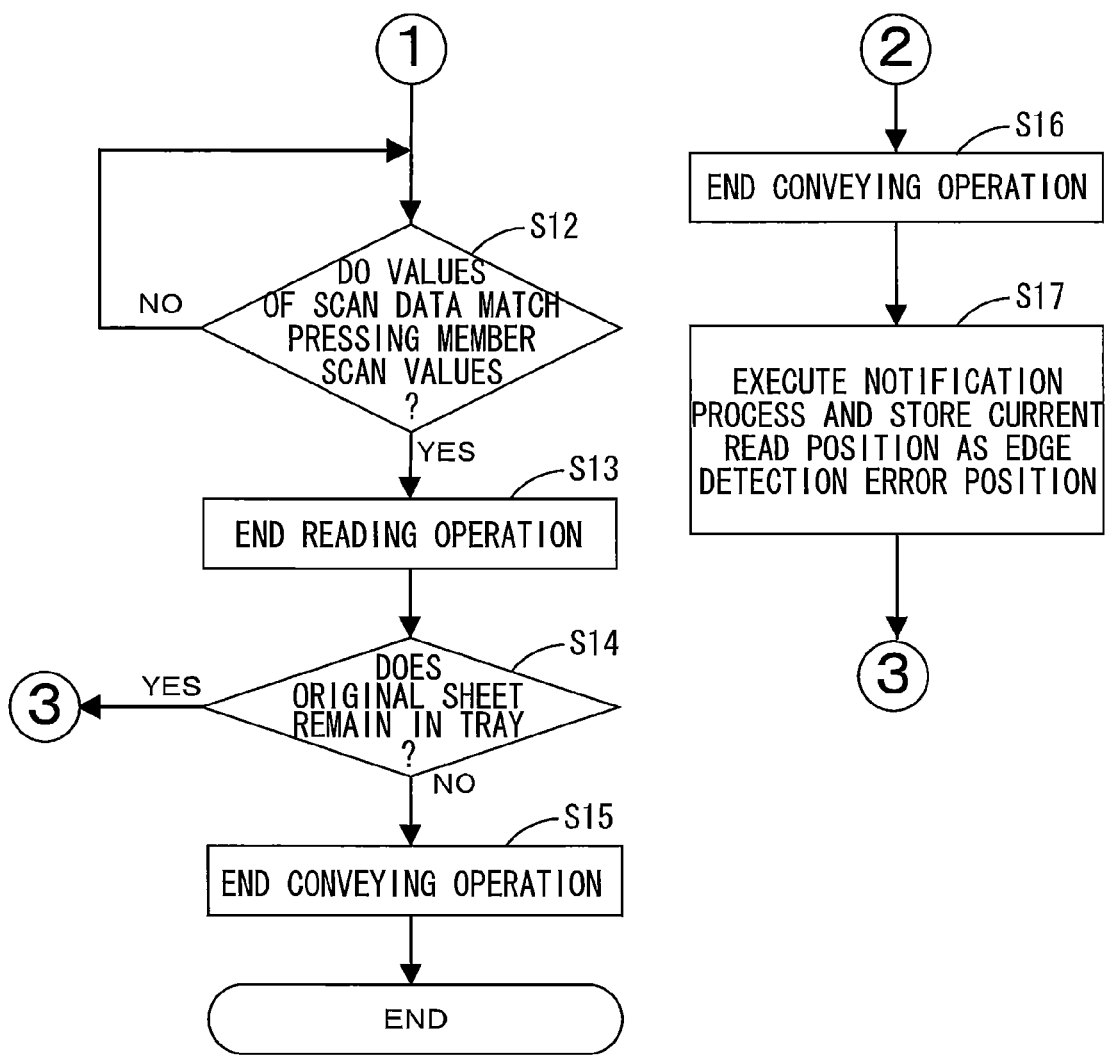
FIG. 5 is a second flowchart illustrating steps in the read control process.

If the user performs an operation on the operating unit 7 to execute an ADF reading operation, for example, the control unit 2 executes the read control process shown in FIGS. 4 and 5 only after determining that an original sheet is present in the original tray 24, based on detection results received from the front sensor 8. In the read control process, the control unit 2 selectively sets the read position of the image-reading unit 3 to one of the first read position X1 and the second read position X2, then begins a reading operation at this read position. The control unit 2 can determine whether an edge of the original sheet has arrived at the read region R1 based on changes in the values of the scan data.

Prior to executing the reading operation, the control unit 2 controls the moving mechanism 4 to move the image-reading unit 3 to a home position X0 directly beneath the dividing member 20. More specifically, the CPU 11 executes a reading operation while moving the image-reading unit 3 and determines that the image-reading unit 3 has arrived at the home position X0 when the image read by the image-reading unit 3 changes from a white image representing the white reference plate 20A to a black image representing a part of the dividing member 20 adjacent to the white reference plate 20A. Upon determining that the image-reading unit 3 has arrived at the home position X0, the CPU 11 halts the moving mechanism 4.

In S1 of FIG. 4, the control unit 2 sets the read position of the image-reading unit 3 to an initial position. The initial position may be either of the first read position X1 and the second read position X2. However, in the embodiment, the reading conditions for the image-reading unit 3 is adjusted such that a reading operation is achieved with highest precision when the image-reading unit 3 is at the first read position X1. Hence, the initial position is set to the first read position X1 in the embodiment. In S2, the control unit 2 controls the image-reading unit 3 to execute a reading operation on the white reference plate 20A or the like at the home position X0 and acquires calibration data required for shading compensation or the like. Note that the processes in S1 and S2 may also be performed in reverse order.

After the calibration data has been acquired, in S3 the control unit 2 determines whether the currently set read position (hereinafter simply called the "current read position") is equal to the read position at which an edge-detection error occurred (hereinafter called the "edge-detection error position"). The control unit 2 determines whether the current read position and the edge-detection error position are the same by referencing edge-detection error data stored in the RAM 13 during the process of S17 described later, for example. Since the process of S17 will not have been executed yet when the read control process (or step S3) is executed for the first time, the RAM 13 initially stores the read position to be different from the initial position (X1 in this example), as the edge-detection error position. That is, in the embodiment, the RAM 13 stores the second read position X2 as the edge-detection error position. Accordingly, in this case the control unit 2 determines that the current read position does not match the edge-detection error position (S3: NO) and in S4 moves the image-reading unit 3 to the current read position (shown in the top half of FIG. 3). That is, the image-reading unit 3 moves to the first read position X1 after the step S3 is executed for the first time.

In S6 the control unit 2 controls the image-reading unit 3 to execute a reading operation on the opposing part of the original-pressing member 28 and stores the acquired scan data in the RAM 13. Since the image-reading unit 3 is currently at the first read position X1 in this case, the control unit 2 stores scan data in one scan line for the first part 28A in the RAM 13. In the following description, values of scan data in one scan line obtained when reading the original-pressing member 28 will be called "pressing-member scan values," while more particularly values of scan data read from the first part 28A will be called "first-part scan values" and values of scan data read from the second part 28B will be called "second-part scan values."

After acquiring scan data for the opposing part of the original-pressing member 28, in S7 the control unit 2 activates the ADF 5 to begin conveying an original sheet and in S8 initiates a reading operation. Note that the processes in S7 and S8 may be performed in reverse order or simultaneously. Alternatively, the control unit 2 may first perform the process in S7 and subsequently perform the process in S8 after a predetermined reference time has elapsed or after the original sheet has been conveyed a predetermined reference distance.

After starting the reading operation, in S9 the control unit 2 determines whether the leading edge of the original sheet has arrived at the read region R1 by determining whether the values of scan data for each pixel of each scan line acquired sequentially during the reading operation match the first-part scan values (pressing-member scan values) for the corresponding pixel. Because as described above, the scan data includes the plurality of values (pixel value for colors, for example) for one pixel, the determination process of S9 compares the values of acquired scan data with the corresponding pressing member scan values. The original sheet has yet to arrive at the read region R1 when the reading operation has just begun. So, the control unit 2 determines that the values of the scan data in the target line match the first-part scan values (S9: YES) and determines in S10 whether a reference time has elapsed since the start of the reading operation. When the reference time has not elapsed since the start of the reading operation (S10: NO), the control unit 2 returns to S9.

When the leading edge of the original sheet in the conveying direction arrives at the read region R1, the image-reading unit 3 begins reading the original sheet instead of the original-pressing member 28. Consequently, the control unit 2 determines in S9 that the values of the scan data for one pixel in the current line do not match the first-part scan values (S9: NO) and, hence, determines that the leading edge of the original sheet has arrived at the read region R1. After reaching this determination, in S11 the control unit 2 begins storing the scan data acquired from this point in the RAM 13 as scan data for the original image (hereinafter referred to as the "original scan data").

The control unit 2 continues to store scan data in the RAM 13 as original scan data as long as the values of the scan data do not match the first-part scan values (S12 of FIG. 5: NO). That is, the control unit 2 determines whether the trailing edge of the original sheet has arrived at the read region R1 by determining whether the values of scan data in each pixel of each scan line acquired sequentially match the corresponding values of the scan data acquired in S6 (first-part scan value or second-part scan value) for the corresponding pixel. When the control unit 2 determines that the values of the current scan data match the first-part scan values (S12: YES), in S13 the control unit 2 determines that the trailing edge of the original sheet in the conveying direction has arrived at the read region R1 and ends the reading operation.

Upon ending the reading operation, in S14 the control unit 2 determines whether any original sheets remain in the original tray 24 based on detection results from the front sensor 8. If an original sheet is present in the original tray 24 (S14: YES), the control unit 2 returns to S3 of FIG. 4 and executes a reading operation at the first read position X1 for the next original sheet. However, if the control unit 2 determines that no original sheets are present in the original tray 24 (S14: NO), in S15 the control unit 2 halts the ADF 5 to end the conveying operation for original sheets and ends the current read control process.

On the other hand, when the control unit 2 determines in S9 and S10 of FIG. 4 that the values of the scan data for each pixel in the current line match the first-part scan values but that the reference time has elapsed (S9: YES, and S10: YES), then the control unit 2 determines that an edge-detection error has occurred because the control unit 2 cannot determine at the current read position whether the edge of the original sheet has arrived at the read region R1. Here, the reference time is set to a sufficient length for conveying an original sheet from the original tray 24 to a position near the original-pressing member 28. An edge-detection error may occur when the background color of the original sheet is the same color or a similar color to the opposing surface of the original-pressing member 28 so that there is little difference in the values of scan data when an original sheet is present at the read region R1 and when an original sheet is absent.

Hence, when the control unit 2 determines that an edge-detection error has occurred as described above (S9: YES, and S10: YES), in S16 the control unit 2 halts the ADF 5. Here, the control unit 2 halts the ADF 5 after a sufficient delay to allow the current original sheet to be discharged from the original tray 24 onto the discharge tray 25. In S17 the control unit 2 executes a notification process for notifying the user that an edge-detection error occurred and stores the current read position in the RAM 13 as the edge-detection error position. That is, the edge-detection error position in the RAM 13 is updated from the second read position X2 to the first read position X1 in this case. Subsequently, the control unit 2 returns to S3.

In the notification process, the control unit 2 displays information on the display unit 6 indicating the possibility that the original sheet became jammed or that an error occurred in detecting the edge of the original sheet and that the current read position should be changed in the latter case. In this way, the scanner 1 can notify the user that the scanner 1 is incapable of determining whether the edge of the original sheet has arrived at the read region R1 using the current read position. Note that the processes in S16 and S17 may be executed in reverse order or simultaneously.

Upon viewing the content displayed on the display unit 6, the user changes the current read position from the first read position X1 to the second read position X2 through input operations on the operating unit 7. When the user performs this operation, in S3 of FIG. 4, the control unit 2 determines that the current read position differs from the edge-detection error position (S3: NO) and in S4 moves the image-reading unit 3 to the current read position (that is, the second read position X2) (see the bottom half of FIG. 3). As described above, the pressing-member scan values acquired in S6 differ depending on whether the image-reading unit 3 is in the first read position X1 or the second read position X2. Therefore, it is highly probable that the values of the scan data when an original sheet is present at the read region R1 and when an original sheet is not present will be different if the image-reading unit 3 is moved to the second read position X2, even if the background color of the original sheet is the same color or a similar color to the opposing surface of the original-pressing member 28.

On the other hand, if the user does not change the current read position upon viewing the content displayed in the process S17, in S3 the control unit 2 determines that the current read position (X1) is the same as the updated edge-detection error position (X1). In this case the control unit 2 proceeds to S5. In S5, the control unit 5 moves the image-reading unit 3 to a position different from the current read position among the first read position X1 and the second read position X2. In the present example, the current read position is set to the first read position X1, in S5 the control unit 3 moves the image-reading unit 3 to the second read position X2.

Accordingly, the control unit 2 executes the process in S6-S8 described above with the image-reading unit 3 in the second read position X2. When the control unit 2 subsequently determines in S9 and S10 that the values of the scan data do not match the first-part scan values before the reference time has elapsed (S9: NO), the control unit 2 can determine that the edge of the original sheet has arrived at the read region R1 without an edge-detection error occurring.

Effects of the First Embodiment

In the first embodiment, the scanner 1 moves the image-reading unit 3 to one of the first read position X1 and the second read position X2 and determines that an edge of the original sheet in the conveying direction of the ADF 5 has arrived at the read region R1 when the values of the scan data acquired during the reading operation change. Here, the values of the scan data obtained when the image-reading unit 3 reads the original-pressing member 28 during a reading operation differ depending on whether the image-reading unit 3 is in the first read position X1 or the second read position X2. Hence, if the values of the scan data are identical regardless whether the image-reading unit 3 is reading the original-pressing member 28 or the original sheet when the image-reading unit 3 is in the first read position X1, the scanner 1 can determine whether the edge of the original sheet has arrived at the read region R1 by moving the image-reading unit 3 to the second read position X2.

Second Embodiment

Figure 6:
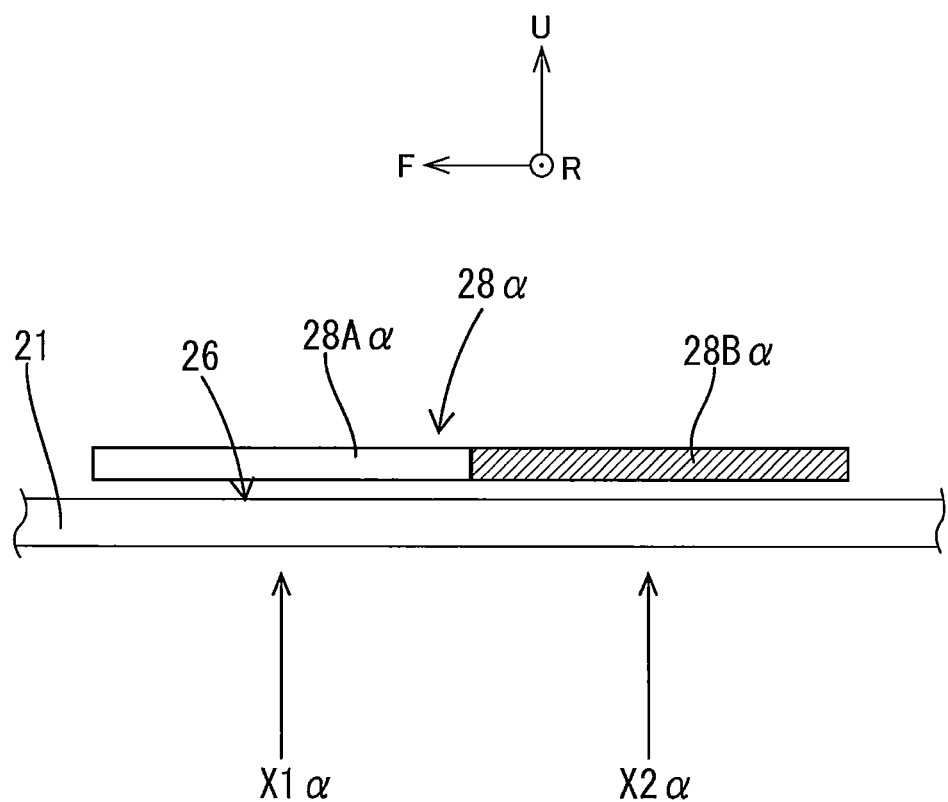
FIG. 6 is a schematic diagram showing the relationship between an original-pressing member and a read position according to a second embodiment of the present invention.

FIG. 6 shows a partial view of the scanner 1 according to a second embodiment. The structure of the scanner 1 according to the second embodiment is identical to that in the first embodiment, except for the structure of the original-pressing member. Hence, like parts and components are designated with the same reference numerals to avoid duplicating description, and only the differing structure will be described below.

As shown in FIG. 6, the scanner includes an original-pressing member 28α according to the second embodiment, instead of the pressing member 28 according to the first embodiment. The original-pressing member 28α is formed along the conveying path 26. The original-pressing member 28α includes a first part 28Aα, and a second part 28Bα. Hence, the original-pressing member 28α is shaped such that the distance between the image-reading unit 3 and the first part 28Aα when the image-reading unit 3 is at a first read position X1α is the same as the distance between the image-reading unit 3 and the second part 28Bα when the image-reading unit 3 is in a second read position X2α.

However, the surfaces of the first part 28Aα and the second part 28Bα opposing the image-reading unit 3 differ in color. Therefore, the values of scan data obtained from the image-reading unit 3 when the image-reading unit 3 reads the original-pressing member 28α during a reading operation differ depending on whether the image-reading unit 3 is in the first read position X1α or the second read position X2α.

Since the distance between the image-reading unit 3 and the original sheet being conveyed along the conveying path 26 is the same, regardless of whether the image-reading unit 3 is in the first read position X1α or the second read position X2α, the image-reading unit 3 in the second embodiment can read images with the same precision at either read position.

Third Embodiment

Figure 7:
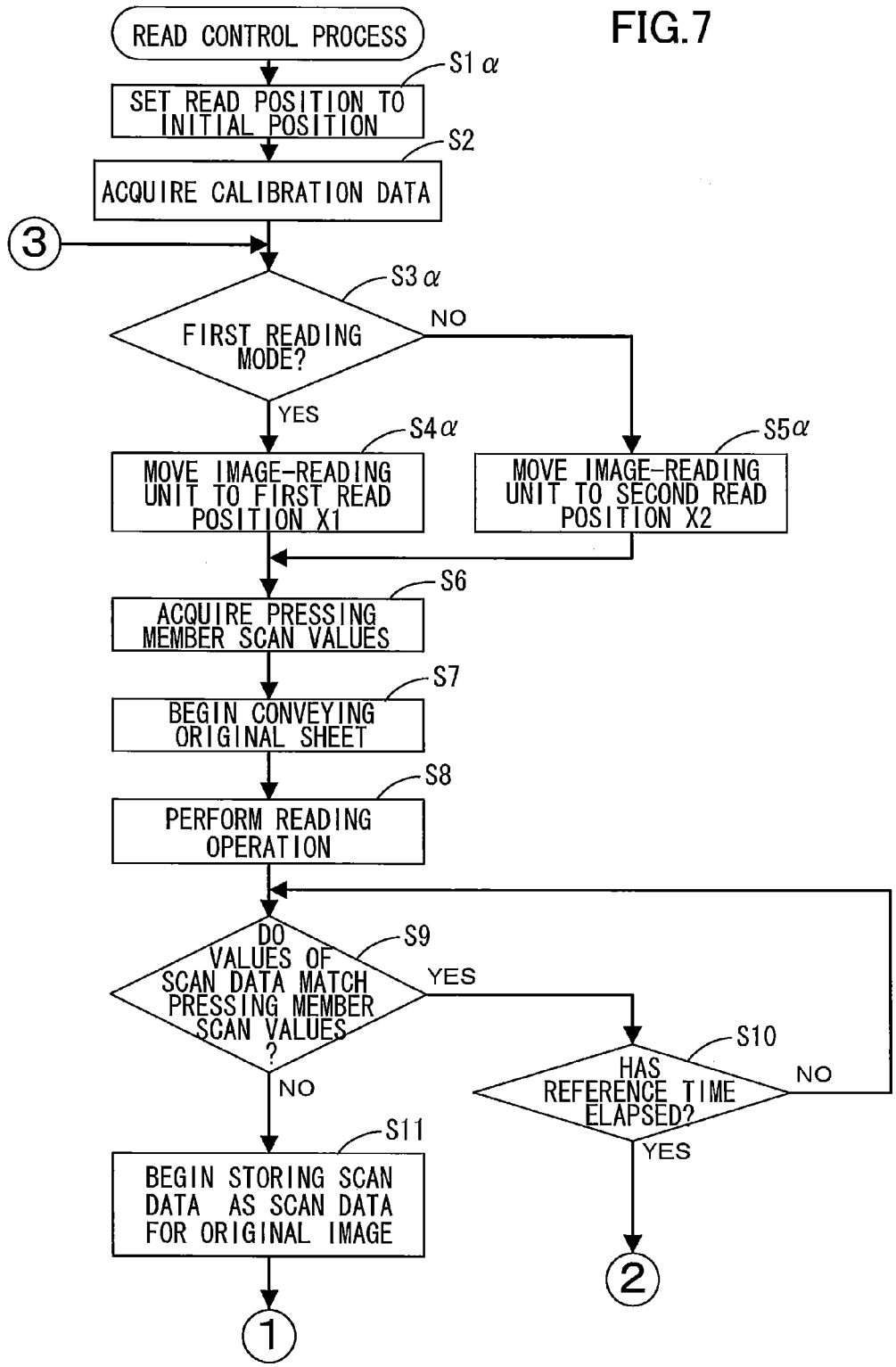
FIG. 7 is a first flowchart illustrating steps in the read control process according to a third embodiment of the present invention.
Figure 8:
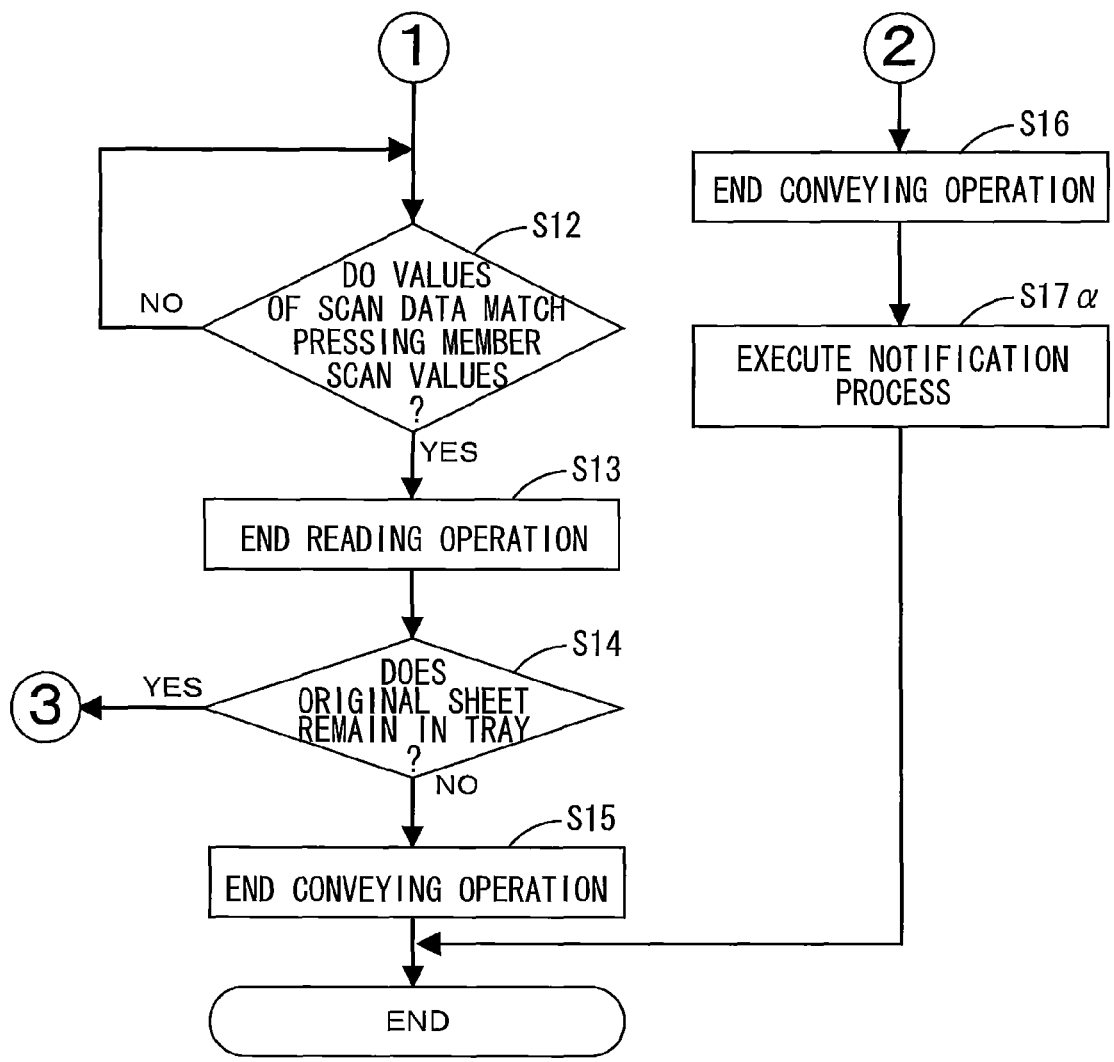
FIG. 8 is a second flowchart illustrating steps in the read control process according to the third embodiment.

Next, a third embodiment of the invention will be described with reference to FIGS. 7 and 8. The third embodiment is identical to the first embodiment except the read control process. Therefore, like parts and components are designated with the same reference numerals and like steps in the read control process are designated with the same step numbers to avoid duplicating description. The following description focuses on the differences.

In S1α the control unit 2 sets the operating mode of the scanner 1 to either a first reading mode or a second reading mode based on input from the user provided via the operating unit 7. Here, configuration data for each of the first and second reading modes includes reading conditions and other information. When the control unit 2 sets the operating mode to the first reading mode, these reading conditions and other information are stored in the RAM 13 together with a first reading mode flag. Similarly, when the control unit 2 sets the operating mode to the second reading mode, the reading conditions and other information are stored in the RAM 13 together with a second reading mode flag.

In S3α the control unit 2 determines which of the first reading mode flag and second reading mode flag is stored in the RAM 13. The control unit 2 advances to S4α when the first reading mode flag is stored in the RAM 13 (S3α: YES) and advances to S5α when the second reading mode flag is stored in the RAM 13 (S3α: NO).

For example, if the control unit 2 determines that the first reading mode flag is stored in the RAM 13 (S3α: YES), in S4α the control unit 2 moves the image-reading unit 3 to the first read position X1. If the control unit 2 subsequently determines from executing the process in S6-S10 that the values of the scan data match the first-part scan values, even though the reference time has elapsed (S9: YES, S10: YES), then the control unit 2 determines that an edge-detection error has occurred, in S16 halts the ADF 5, and in S17α executes a notification process to notify the user of this edge-detection error. Subsequently, the control unit 2 ends the current read control process.

Upon viewing the content displayed on the display unit 6 regarding the edge-detection error, the user inputs an instruction on the operating unit 7 for shifting to the second reading mode. In response, the control unit 2 deletes the first reading mode flag and stores the second reading mode flag. In S3α the control unit 2 determines that the first reading mode flag is not stored in the RAM 13, and proceeds to S5α. In S5α the control unit 2 moves the image-reading unit 3 to the second read position X2.

The control unit 2 executes the process in S6-S8 described above with the image-reading unit 3 at the second read position X2. When executing the process in S9 and S10, the control unit 2 determines that the values of the scan data no longer match the first-part scan values before the reference time elapses (S9: NO). Therefore, the control unit 2 can determine when the edge of the original sheet has arrived at the read region R1 without an edge-detection error occurring.

While the invention has been described in detail with reference to the embodiments thereof, it would be apparent to those skilled in the art that various changes and modifications may be made therein without departing from the scope of the invention.

In the embodiments described above, the present invention is applied to a scanner 1 having only a scanner function. However, the present invention may be applied to other image-reading devices, such as a facsimile machine or a multifunction peripheral capable of implementing various other functions, such as a copier function, in addition to a scanner function, for example.

In the embodiments, the control unit 2 is provided with a CPU 11 and an image process unit 14 for executing the read control process. However, the control unit 2 may be configured to execute the read control process with a plurality of CPUs or with only a hardware circuit, such as an application-specific integrated circuit (ASIC).

In the embodiments, the light-emitting unit 31 of the image-reading unit 3 is disposed downstream of the light-receiving unit 32 in the conveying direction. However, the light-emitting unit 31 may be disposed upstream of the light-receiving unit 32 instead.

In the read control process described in the embodiments, the image-reading unit 3 may be configured to execute a reading operation at a third read position other than the first and second read positions X1 and X2 such that a distance between the image-reading unit 3 at the third read position and the original-pressing member 28 is different from the distances D1 and D2. An example of a different read position is a position in which the read region R1 of the image-reading unit 3 is set to a region on the bottom surface of the second part 28B different from that shown in FIG. 3 (a region on the rear side of the second part 28B). In other words, the image-reading unit 3 may be configured to execute a reading operation at a plurality of read positions, each of which opposes the original-pressing member 28 apart from a different distance.

While the control unit 2 sets the initial position of the image-reading unit 3 as a reading condition in S1 of FIG. 4, the user may instead select one of the first and second read positions X1 and X2 through input operations on the operating unit 7, and the control unit 2 may set the initial position based on this user input. In this way, the control unit 2 can set a reading position according to the user's wishes.

Instead of executing the process of S6 in the read control process, the control unit 2 may determine whether any changes have occurred in the values of the scan data acquired sequentially in the reading operation of S8 and may determine that an edge of the original sheet has arrived at the read region R1 based on these determination results.

Upon determining that an edge-detection error has occurred in the read control process (S10: YES), the control unit 2 may be configured to automatically change the current read position and to perform a process to move the image-reading unit 3 to the new read position without input from the user. By automatically changing the read position, the control unit 2 can thereafter determine when an edge of an original sheet arrives at the read region R1 without relying on input from the user.

In the embodiments, the original-pressing member 28 varies in shape or color in order to produce different pressing-member scan values depending on whether the image-reading unit 3 is in the first read position or the second read position. However, it is also possible to form the opposing surface of the original-pressing member with a plurality of regions having different reflectances, for example.

In S9 of the embodiment, the control unit 2 determines whether the leading edge of the original sheet has arrived at the read region R1 by determining whether the values of scan data for each pixel in the target scan line match the pressing-member scan values for the corresponding pixel. That is, the control unit 2 determines that the leading edge of the original sheet has not arrived at the read region R1 when the values of scan data in all pixels in the target scan line match the pressing-member scan values for corresponding pixels. The control unit 2 determines that the leading edge of the original sheet has arrived at the read region R1 when one value of scan data in one pixel in the target scan line does not match the corresponding pressing-member scan values. However, in S9 the control unit 2 may determine whether the leading edge of the original sheet has arrived at the read region R1 by determining whether differences between values of scan data of each pixel in the target scan line and pressing-member scan values of the corresponding pixel are within predetermined thresholds. That is, the control unit 2 determines that the leading edge of the original sheet has not arrived at the reading region R1 when the differences between values of scan data of all pixels in the target scan line and the pressing-member scan values of the corresponding pixels are within the predetermined thresholds. The control unit 2 determines that the leading edge of the original sheet has arrived at the reading region R1 when one of the differences between values of scan data of each pixel in the target scan line and pressing-member scan values of the corresponding pixel exceeds the corresponding predetermined thresholds. In the determination of S9, pixel values for all pixels in the target line are compared with the corresponding pressing-member scan values. However, pixel values for at least one pixels in the target line may be compared with the corresponding pressing-member scan values. Or, representative value such as average pixel value for at least two pixels in the target line may be compared with average pressing-member scan values for corresponding at least two pixels. Further, all pixel values for one pixel may not be compared with the corresponding pressing-member scan values, but representative pixel value(s) from among all pixel values for one pixel may be compared with corresponding representative pressing-member scan values.

The determination process S12 may be modified similarly to the above described modifications of the process S9. That is, the control unit 2 determines that the trailing edge of the original sheet has not arrived at the reading region R1 when the differences between values of scan data of all pixels in the target scan line and the pressing-member scan values of the corresponding pixels exceeds the predetermined thresholds. The control unit 2 determines that the trailing edge of the original sheet has arrived at the reading region R1 when one of the differences between values of scan data of each pixel in the target scan line and pressing-member scan values of the corresponding pixel are within the corresponding predetermined thresholds. In the determination of S12, pixel values for all pixels in the target line are compared with the corresponding pressing-member scan values. However, pixel values for at least one pixels in the target line may be compared with the corresponding pressing-member scan values. Or, representative value such as average pixel value for at least two pixels in the target line may be compared with average pressing-member scan values for corresponding at least two pixels. Further, all pixel values for one pixel may not be compared with the corresponding pressing-member scan values, but representative pixel value(s) from among all pixel values for one pixel may be compared with corresponding representative pressing-member scan values.

What is claimed is:

1. An image reading device comprising:
   a conveying unit configured to convey an original sheet along a conveying path;
   an image reading unit having a reading region on the conveying path, and configured to perform a reading operation to generate an image value representing an image in the reading region;
   an opposing member opposing the image reading unit, the original sheet passing a space between the image reading unit and the opposing member, the opposing member having a first part and a second part;
   a moving unit configured to move the image reading unit between a first read position and a second read position, the first part overlapping on the reading region when the image reading unit is positioned at the first read position, the second part overlapping on the reading region when the image reading unit is positioned at the second read position, an image value that the image reading unit generates by reading an image of the first part when the image reading unit is positioned at the first read position being different from an image value that the image reading unit generates by reading an image of the second part when the image reading unit is positioned at the second read position; and
   a control device configured to:
      set a read position to selected one of the first read position and the second read position;
      control the moving unit to move the image reading unit to the read position;
      control the image reading unit at the read position to perform the reading operation to generate the image value; and
      determine that one of a leading edge of the original sheet and a trailing edge of the original sheet reaches the reading region when image values generated by the image reading unit are changed while the conveying unit conveys the original sheet along the conveying path.

2. The image reading device according to claim 1, wherein the control device is further configured to control the image reading unit to start performing the reading operation before the original sheet reaches the reading region,
   wherein the control device determines that the leading edge of the original sheet reaches the reading region when the image values generated by the image reading unit are changed while the conveying unit conveys the original sheet along the conveying path.

3. The image reading device according to claim 2, further comprising an informing unit,
   wherein the control device is further configured to:
      determine that an error has been occurred when the image values do not change after a prescribed period of time has elapsed since the image reading unit started performing the reading operation; and
      control the informing unit to inform that the error has occurred.

4. The image reading device according to claim 3, wherein the control device is configured to control the moving unit to move the image reading unit to non-selected one of the first read position and the second read position when the control device determines that the error has been occurred.

5. The image reading device according to claim 1, further comprising an operation unit through which a user can input an instruction,
   wherein the control device is configured to set the read position to one of the first read position and the second read position based on the instruction.

6. The image reading device according to claim 1, wherein a first distance between the image reading unit and the opposing member when the image reading unit is at the first read position is different from a second distance between the image reading unit and the opposing member when the image reading unit is at the second read position.

7. The image reading device according to claim 1, wherein the first part has a first color and the second part has a second color different from the first color.

8. The image reading device according to claim 1, wherein the control device is configured to determine that the image values generated by the image reading unit are changed while the conveying unit conveys the original sheet along the conveying path when a change of the image values exceeds a prescribed threshold while the conveying unit conveys the original sheet along the conveying path.

9. A non-transitory computer-readable storage medium storing computer-readable instructions executed by a control device for controlling an image reading device that comprises: a conveying unit configured to convey an original sheet along a conveying path; an image reading unit having a reading region on the conveying path, and configured to perform a reading operation to generate an image value representing an image in the reading region; an opposing member opposing the image reading unit, the original sheet passing a space between the image reading unit and the opposing member, the opposing member having a first part and a second part; and a moving unit configured to move the image reading unit between a first read position and a second read position, the first part overlapping on the reading region when the image reading unit is positioned at the first read position, the second part overlapping on the reading region when the image reading unit is positioned at the second read position, an image value that the image reading unit generates by reading an image of the first part when the image reading unit is positioned at the first read position being different from an image value that the image reading unit generates by reading an image of the second part when the image reading unit is positioned at the second read position, the instructions comprising:
   setting a read position to selected one of the first read position and the second read position;
   controlling the moving unit to move the image reading unit to the read position;
   controlling the image reading unit at the read position to perform the reading operation to generate the image value; and
      determining that one of a leading edge of the original sheet and a trailing edge of the original sheet reaches the reading region when image values generated by the image reading unit are changed while the conveying unit conveys the original sheet along the conveying path.

* * * * *